United States Patent

[11] 3,563,150

| [72] | Inventors | Heinrich Klemann<br>Burgsolms;<br>Herbert Leiter, Garbenheim; Klaus Weber,<br>Wetzlar, Germany |
|---|---|---|
| [21] | Appl. No. | 737,040 |
| [22] | Filed | June 14, 1968 |
| [45] | Patented | Feb. 16, 1971 |
| [73] | Assignee | Ernst Leitz GmbH<br>Wetzlar, Germany |
| [32] | Priority | June 15, 1967 |
| [33] | | Germany |
| [31] | | L56753 |

[54] BELLOWS CAMERA HAVING REFLEX MIRROR AND AUTOMATIC EXPOSURE CONTROL
3 Claims, 2 Drawing Figs.

[52] U.S. Cl. ..................................................... 95/42,
355/45
[51] Int. Cl. ....................................................... G03b 19/12
[50] Field of Search .......................................... 95/42;
355/38, 45, (Consult: Horan, Peters)

[56] References Cited
UNITED STATES PATENTS

| 2,351,753 | 6/1944 | Flint et al. ..................... | 95/42 |
| 2,749,799 | 6/1956 | Strem ........................... | 95/42X |

FOREIGN PATENTS

| 782,422 | 9/1957 | Great Britain ................ | |

*Primary Examiner*—John M. Horan
*Assistant Examiner*—M. L. Gellner
*Attorney*—Krafft and Wells ABSTRACT: In a bellows camera for particular use on microscopes for photomicrographic purposes there is disposed a pivotable reflex mirror in front of the film plane, which mirror is adapted to reflect the image-forming light rays to a viewing screen. A first diaphragm is arranged in a plane conjugate to the film plane but laterally spaced from the cone of image-forming rays, and a light-sensitive element is placed behind said diaphragm. A second diaphragm is provided in the plane of the viewing screen through which diaphragm the reflex mirror in its viewing position reflects the same rays that are incident on the light-sensitive element when said reflex mirror is in its exposure position.

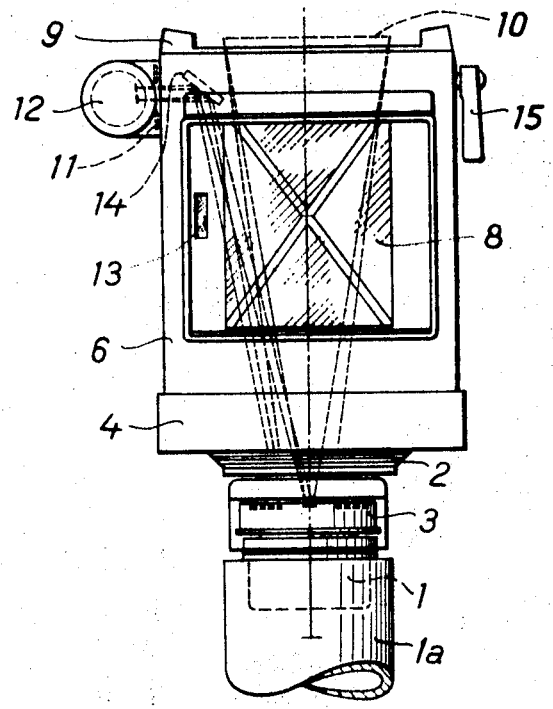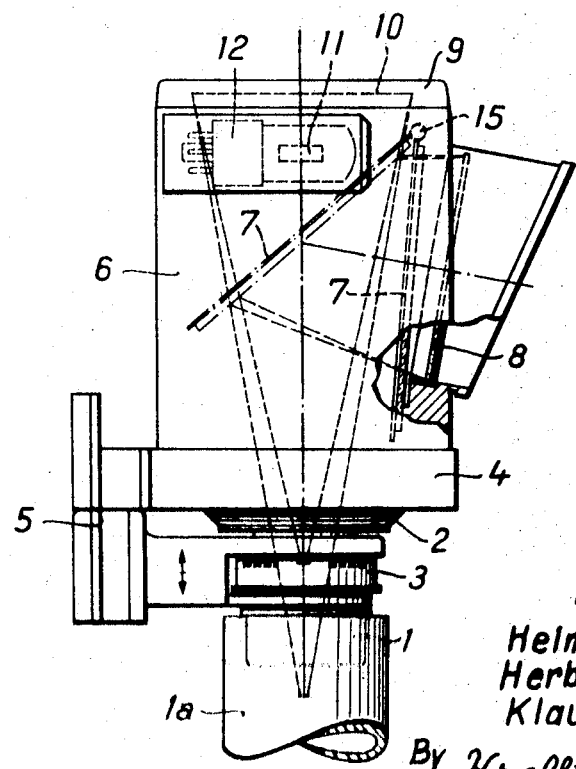

3,563,150

BELLOWS CAMERA HAVING REFLEX MIRROR AND AUTOMATIC EXPOSURE CONTROL

CROSS REFERENCES TO RELATED APPLICATIONS

Applicants claim priority under 35 USC 119 for application No. L 56 753 filed June 15, 1967 in the Patent Office of the Federal Republic of Germany.

Reference is further made to U.S. Pat. No. 3,205,767 issued Sept. 14, 1965 to the present coinventor Klaus Weber, and to the English Pat. No. 782,422.

BACKGROUND OF THE INVENTION

1. Field of the Invention

The invention pertains to bellows cameras which are to be used for photomicrographic purposes in combination with microscopes and which comprise an automatic exposure control device.

2. Description of the Prior Art

Bellows cameras on microscopes for the purpose of photomicrography are already known, and more particular, there are also bellow camera known which are provided with a pivotable reflex mirror which reflects the section to be photographed to a viewing screen. Further, there are already known to those skilled in this particular art exposure control devices for use in photomicrographic apparatuses. These devices usually comprise a beam splitter by means of which a portion of the image-forming light rays is reflected onto a light-sensitive element. The latter is part of an electric circuit which starts the closing movement of the shutter, previously manually opened. Devices of this kind are preferably used with 35 mm. cameras which have a predetermined fixed image distance and thus also a fixed enlargement ratio. However, these devices cannot be used with bellows cameras, because the variable extension of the bellows entails a variable enlargement ratio. The latter must be taken into account in the exposure ratio. The latter must be taken into account in the exposure control mechanism, which up to now required a complicated device.

On the other hand, it is already known to perform the light measurement in the film plane by the side of the plate holder. With this method it is a disadvantage, however, that the operator cannot view the section which is actually measured. Consequently, he cannot introduce adjustments which might be required into the control device.

SUMMARY OF THE INVENTION

It is an object of the present invention to provide a bellows camera for photomicrographic purposes which eliminate the above described drawbacks. According to the invention this goal is achieved by disposing a first diaphragm in a plane equivalent to the film plane and by disposing a mirror in the camera housing which reflects a portion of the light bundle into this diaphragm. A light-sensitive element is arranged behind said diaphragm, on which element the reflected light portion impinges. A second diaphragm is provided in the plane of the viewing screen in such a way that the same light portion which during the exposure is incident in the first diaphragm is during viewing reflected by the reflex mirror into this second diaphragm. It should be noted that the reflected light portion is selected from a part of the light cone which does actually form the image in the film plane, but belongs to an outer part of that cone. Therefore, the second diaphragm is located by one side of the viewing screen.

In order to utilize the used film size in an optimal manner, it is advisable to arrange the camera housing with the plateholder swivelably on the bellows carrier. Further, it is advisable to use a photomultiplier tube as the light-sensitive element.

DESCRIPTION OF THE DRAWINGS

The invention will be more fully comprehended from the following description when taken in conjunction with the appending drawings wherein:

FIG. 1 is a front view of the camera housing with a bellows extending between camera and shutter on a microscope;

FIG. 2 is a side view of the same camera.

DESCRIPTION OF THE PREFERRED EMBODIMENT

Between a phototube 1 on a microscope 1a and a bellows 2 there is mounted a shutter 3 in such a way that it is neither rigidly connected to the tube 1 nor to the bellows. The bellows 2 is suspended beneath a carrier plate 4 which, in turn, is supported by a stand 5. On the carrier plate 4 is mounted the housing 6 of a reflex mirror arrangement comprising a reflex mirror 7 and a viewing screen 8. The housing being mounted swivelably for making possible the utilization of the film size in the best possible manner. On the upper side of housing 6 is provided a support 9 for the plate holder (not shown).

In one side of housing 6 there is provided a measuring diaphragm 11 in a plane conjugate to the film plane 10. In the direction of light travel behind diaphragm 11 is disposed a photomultiplier tube 12.

In the plane of viewing screen 8 is one one side arranged a second measuring diaphragm 13. With the re reflex mirror 7 in its viewing position the same portion of light impinges on the second measuring diaphragm 13 as is incident of the first measuring diaphragm 11 when the reflex mirror 7 is in its exposure position. In the latter case the light portion is reflected by a mirror 14 onto diaphragm 11, which mirror 14 is also arranged inside of housing 6.

On the side opposite to the side of the photomultiplier tube 12 there is arranged on housing 6 a handle 15 for pivoting the reflex mirror 7.

The function of the described device is as follows:

When the image of the object to be photographed is brought into focus on viewing screen 8 a portion of light rays is incident on the measuring diaphragm 13. The portion is not utilized for forming the image on the film, which image corresponds in size to the viewing screen 8. This portion of light rays, however, is part of the total light cone emanating from the objective and the projection ocular and impinging on the film plane. Since the film sizes usually are used are rectangular shape it is advisable to employ a light portion which is located near one of the longer sides of the rectangle.

The operator can thus view a portion of the total image on the second measuring diaphragm 13 of which the object density can easily be compared with the object density on the viewing screen. The same portion of light rays which through the focusing operation is incident on the measuring diaphragm 13 will during the exposure impinge on the photomultiplier tube 12 behind the measuring diaphragm 11 after reflection by mirror 14. It is thus ensured that for exposure control the very same light portion is utilized which previously formed the image in the second measuring diaphragm 13. By comparing the object density on the viewing screen 8 the operator is in a position to determine adjustment value which he can introduce in the electronic circuit which is connected to the photomultiplier tube. By using a photomultiplier tube having a high sensitivity an automatic exposure control can be performed through a very great range.

The swivelable arrangement of the housing 6 on the bellows carrier plate enables the user to utilize the given film size to its best, since by turning the housing the film size or negative plate may be positioned in different portions of the total image projected by the ocular into the film or image plane.

In order to bring still the most minute details into focus —even the grain of the viewing screen is too coarse —the viewing screen is provided with stripes of clear glass so that by employing a magnifying glass even those details may be brought exactly into focus.

I claim:

1. A bellows camera for use on microscopes for photomicrographic purposes, the camera having a reflex viewing device and an automatic exposure control and comprising in combination:

a shutter disposed between the microscope tube and the camera housing;

a bellows suspended between a bellows carrier plate and said shutter;

a camera housing mounted on said bellows carrier plate and including a pivotable reflex mirror, a viewing screen, and a plateholder on its upper side;

a first measuring diaphragm disposed in a plane conjugate to the film or image of the camera;

a mirror in the camera housing, said mirror reflecting a portion of the total image-forming light rays into said first measuring diaphragm when said reflex mirror is in its exposure position;

a second measuring diaphragm being disposed in the plane of said viewing screen in a place whereon the same portion of image-forming light rays which is reflected into said first measuring diaphragm when said reflex mirror is in its exposure position is reflected by said pivotable reflex mirror when the latter is in its viewing position; and a light-sensitive element behind said first measuring diaphragm.

2. A bellows camera according to claim 1 wherein a photomultiplier tube is used as a light-sensitive element.

3. A bellows camera according to claim 1 wherein the camera housing is mounted swivelably on said bellows carrier plate.